United States Patent
Endo et al.

(10) Patent No.: US 9,025,165 B2
(45) Date of Patent: May 5, 2015

(54) NORMAL VECTOR TRACING ULTRA-PRECISION SHAPE MEASUREMENT METHOD

(75) Inventors: Katsuyoshi Endo, Suita (JP); Junichi Uchikoshi, Suita (JP); Yasuo Higashi, Tsukuba (JP)

(73) Assignee: Osaka University, Suita-shi, Osaka (JP)

( * ) Notice: Subject to any disclaimer, the term of this patent is extended or adjusted under 35 U.S.C. 154(b) by 101 days.

(21) Appl. No.: 13/817,264

(22) PCT Filed: Jun. 15, 2011

(86) PCT No.: PCT/JP2011/063679
§ 371 (c)(1),
(2), (4) Date: Mar. 8, 2013

(87) PCT Pub. No.: WO2012/023335
PCT Pub. Date: Feb. 23, 2012

(65) Prior Publication Data
US 2013/0188199 A1  Jul. 25, 2013

(30) Foreign Application Priority Data

Aug. 17, 2010  (JP) ................................ 2010-182197

(51) Int. Cl.
G01B 11/30 (2006.01)
G01B 11/24 (2006.01)
(Continued)

(52) U.S. Cl.
CPC ............. *G01B 11/24* (2013.01); *G01M 11/005* (2013.01); *G01M 11/0271* (2013.01)

(58) Field of Classification Search
CPC .. G01B 11/24; G01B 11/2433; G01B 11/245; G01B 11/306; G02B 21/0016
USPC ...................................... 356/612, 601, 237.2
See application file for complete search history.

(56) References Cited

U.S. PATENT DOCUMENTS 4,957,369 A * 9/1990 Antonsson .................... 356/608
5,189,799 A * 3/1993 Fairer et al. .................... 33/281
(Continued)

FOREIGN PATENT DOCUMENTS

JP  2004-213472 A1  7/2004
JP  3596963 B2  12/2004
(Continued)

OTHER PUBLICATIONS

Y. Higashi, et al.; "Development of surface gradient integrated profiler—Precise coordinate determination of normal vector measured points by self-calibration method and new data analysis from normal vector to surface profile-," (8 Sheets), Proc. SPIE 7077, Advances in X-Ray/EUV Optics and Components III, 70770C (Sep. 18, 2008); doi:10.1117/12.796070.
(Continued)

Primary Examiner — Roy M Punnoose
Assistant Examiner — Isiaka Akanbi
(74) Attorney, Agent, or Firm — Kratz, Quintos & Hanson, LLP

(57) ABSTRACT

Of two pairs of biaxial goniometers and a uniaxial straight-ahead stage, one pair of biaxial goniometers and the uniaxial straight-ahead stage are subjected to fully-closed feedback control (follow-up control) under which output from a QPD is directly input into an axis drive motor, and the remaining pair of biaxial goniometers are subjected to semi-closed feedback control (constant-value control), encoder outputs on all the axes and QPD output are acquired simultaneously, measurement point coordinates and normal vectors derived from the encoder outputs are corrected with the QPD output, thereby eliminating influence of steady-state deviation in a goniometer control system.

4 Claims, 13 Drawing Sheets

(51) Int. Cl.
*G01M 11/00* (2006.01)
*G01M 11/02* (2006.01)

(56) References Cited

U.S. PATENT DOCUMENTS 6,902,326 B1 * 6/2005 Ames et al. .................... 385/60
2008/0218728 A1 * 9/2008 Kirschner .................... 356/4.01

FOREIGN PATENT DOCUMENTS

JP 2009-44812 A1 2/2009
JP 2010-38792 A1 2/2010
JP 2010038792 A * 2/2010

OTHER PUBLICATIONS

Takacs, et al.; "Improvements in the accuracy and the repeatability of long trace profiler measurements;" http://www.ncbi.nlm.nih.gov/pubmed/18324056 (1 Sheet), Applied Optics, vol. 38, Issue 25, pp. 5468-5479 (1999).
International Search Report for International Application No. PCT/JP2011/063679 dated Sep. 6, 2011.

* cited by examiner (a)

Steady-state position deviation on C1 axis··· 2 μ radPV (b)

Steady-state position deviation on A1 axis··· 6 μ radPV (a) Results of three-dimensional shape measurement of R = 400 spherical mirror (b) Shape error with respect to ideal shape in three-dimensional shape measurement (c) Repeatability measurement error resulting from two measurements

NORMAL VECTOR TRACING ULTRA-PRECISION SHAPE MEASUREMENT METHOD

TECHNICAL FIELD

The present invention relates to a normal vector tracing ultra-precision shape measurement method, and more specifically to a normal vector tracing ultra-precision shape measurement method by which the shape of an entire surface of an object to be measured is measured using coordinates at a finite number of discrete measurement points on the surface of the object and actual measurement values of normal vectors.

BACKGROUND ART

For manufacturing next-generation high-precision optical elements required for lithography techniques using X-ray free electron laser and extreme-ultra violet rays with a wavelength of 13.5 nm, it is essential to measure the shapes of aspheric and free-form surfaces with precisions of 1 to 0.1 nm RMS. Such X-ray optical elements, typically X-ray reflection mirrors, need to have a size of 10 to 500 cm and attain the foregoing precisions over the entire reflection surfaces. In addition, there is also demand for ultra-precision shape measurement of mass-produced consumer-use aspheric mirrors and lenses with various curvatures. As means for measuring surface roughness with a space wavelength of 1 mm or less, probe microscopes with atomic-level resolutions meet precision requirements under the present situation. However, the probe microscopes are capable of measurement at one time in an extremely small range of about 50 µm in all directions, and take long measurement time and thus are not suited for measuring the shape of an entire object to be measured. Meanwhile, as a technique for shape measurement with a space wavelength of 1 mm or more, Long Trace Profilers (LTPs) are used to irradiate an object to be measured with a narrow laser beam with a diameter of about 1 mm and measure obtained displacements of reflected light to determine inclination angles on the surface of the object. The measurement technique achieves a measurement precision of $5 \times 10^{-7}$ rad RMS (3 nm RMS), but is only for two-dimensional shape measurement with a limited measurement range off ±5 m rad. In addition, point light source interferometry achieves a measurement precision of 0.3 nm RMS, but in principle in this measurement method, spherical waves from a point light source are referred to, which makes it difficult to measure the shapes of aspheric surfaces.

To solve the foregoing conventional issue, Patent Literatures 1 and 2 each suggest an ultra-precision shape measurement method. In the principle of the shape measurement method, the straight-ahead moving property of light is utilized to trace a normal vector on the surface of an object; two pairs of biaxial goniometers are subjected to follow-up control with feedback of QPD output, so as to allow a laser beam emitted from a light source to be reflected by a mirror and returned to the center of a detector (quartered photodiode: QPD) positioned at the light source; and a uniaxial straight-ahead stage along the direction of an optical axis is subjected to follow-up control with feedback of QPD output, so as to keep constant a light path length (L) between the detector and the surface of the object to be measured, thereby realizing a null method with alignment of incoming and reflecting lights and higher-speed measurement. Specifically, one pair of goniometers constitutes a sample system and holds the object to be measured at its movable part, and the other pair of goniometers constitutes an optical system and has the light source and the QPD at its movable part, and the sample system or the optical system is driven by the uniaxial straight-ahead stage. Normal vectors at arbitrary measurement points (coordinates) on the mirror are determined by outputs from encoders of the goniometers, and the shape of the object is derived from the measurement data.

According to the normal vector tracing ultra-precision shape measurement method disclosed in Patent Document 1, on measurement of coordinates and normal vectors at measurement points, one pair of biaxial goniometers is instructed to measure the measurement point coordinates, output from the QPD is read into a computer, the other pair of biaxial goniometers is controlled to make the output minimum, and then outputs from a five-axis linear encoder on the straight-ahead stage keeping constant the light path length L, which is controlled separately from four-axis rotary encoders, are read simultaneously. Conventionally, the two pairs of biaxial goniometers and the uniaxial straight-ahead stage along the direction of an optical axis are subjected to semi-closed feedback control to achieve shape measurement with a shape precision of 2 nm RMS and a slope error of $5 \times 10^{-7}$ rad RMS. However, the measurement method uses semi-closed feedback control using computers, and thus takes several hours of measurement time and is susceptible to influence of disturbance factors such as temperature changes or the like.

Accordingly, Patent Literature 2 discloses an invention of a measurement method in which, of two pairs of biaxial goniometers and a uniaxial straight-ahead stage, the biaxial goniometers constituting an optical system and the uniaxial straight-ahead stage are subjected to fully-closed feedback control under which output from a light detector is input directly into an axis drive motor, and the biaxial goniometers constituting a sample system are subjected to semi-closed feedback control, thereby allowing quick measurement of normal vectors at measurement point coordinates and short-time measurement of the surface shapes of objects. In addition, the method disclosed in Patent Literature 2 allows precision measurement of the shapes of large-sized objects.

CITATION LIST

Patent Literatures

Patent Document 1: Japanese Patent No. 3598983
Patent Document 2: JP-A No. 2010-038792

SUMMARY OF INVENTION

Technical Problem

However, only by tracing of normal vectors in which the two pairs of biaxial goniometers and the biaxial straight-ahead stage along the direction of an optical axis are subjected to follow-up control, it is not possible to avoid data on normal vectors and measurement point coordinates from being influenced by steady-state deviation in the control system, due to limits on response of the drive axis control system. As a result, angle measurement in the normal vector cannot be made with a high precision of 1 µrad or more, and thus precisions of shape measurement of 1 nm PV or more cannot be realized. However, it has been found out that the encoders and the QPD are extremely excellent in responsiveness, and thus output values from the encoders and the QPD are accurate in each moment even though the output values vary from time to time under influence of steady-state deviation depending on performance of the control system. The present invention has been completed based on the foregoing findings.

Specifically, in light of the foregoing circumstances, an object of the present invention is to provide a normal vector tracing ultra-precision shape measurement method by which a surface shape of an object to be measured is derived from coordinates at measurement points and measurement values of normal vectors, wherein, of two pairs of biaxial goniometers and a uniaxial straight-ahead stage, one pair of biaxial goniometers and the uniaxial straight-ahead stage are subjected to fully-closed feedback control under which output from an optical detector (QPD) is input directly into an axis drive motor, and the remaining pair of biaxial goniometers is subjected to semi-closed feedback control, and QPD output and five-axis encoder outputs are read simultaneously, thereby achieving high-precision shape measurement not affected by steady-state deviation and shortened measurement time.

Solution to Problem

To solve the foregoing problem, the present invention provides a normal vector tracing ultra-precision shape measurement method including the steps of: preparing at least two pairs of biaxial goniometers and a uniaxial straight-ahead stage changing a distance between rotation centers of the goniometers, wherein one pair of goniometers constitutes a sample system and holds an object to be measured at a movable part thereof, and the other pair of goniometers constitutes an optical system and has at a movable part thereof a light source and a light detector using a quartered photodiode (QPD) based on a null method; controlling the two pairs of biaxial goniometers to overlap completely a measurement beam emitted from the light source and a reflection beam reflected on the surface of the object to be measured; controlling the uniaxial straight-ahead stage to keep constant a light path length L between the light detector and the surface of the object to be measured; and measuring a normal vector at an arbitrary measurement point on the surface of the object to be measured to determine the shape of the object to be measured, wherein, of the two pairs of biaxial goniometers and the uniaxial straight-ahead stage, one pair of biaxial goniometers and the uniaxial straight-ahead stage are subjected to fully-closed feedback control (follow-up control) under which output from the QPD is input directly into an axis drive motor, the remaining pair of biaxial goniometers is subjected to semi-closed feedback control (constant value control), encoder outputs on all the axes and QPD output are acquired simultaneously, and measurement point coordinates and normal vectors derived from the encoder outputs are corrected with the QPD output, thereby to eliminate influence of steady-state deviation in the goniometer control system (Claim 1).

In the foregoing arrangement, it is preferred that the biaxial goniometers constituting the optical system and the uniaxial straight-ahead stage are subjected to fully-closed feedback control under which output from the QPD is input directly into the axis drive motor, and the biaxial goniometers constituting the sample system are subjected to semi-closed feedback control (Claim 2).

In another aspect, the present invention provides a normal vector tracing ultra-precision shape measurement method including the steps of: preparing at least two pairs of biaxial goniometers and a uniaxial straight-ahead stage changing a distance between rotation centers of the goniometers, wherein one pair of goniometers constitutes a sample system and holds an object to be measured at a movable part thereof, and the other pair of goniometers constitutes an optical system and has at a movable part thereof a light source and a light detector using a quartered photodiode (QPD) based on a null method; controlling the two pairs of biaxial goniometers to overlap completely a measurement beam emitted from the light source and a reflection beam reflected on the surface of the object to be measured; controlling the uniaxial straight-ahead stage to keep constant a light path length L between the light detector and the surface of the object to be measured; and measuring a normal vector at an arbitrary measurement point on the surface of the object to be measured to determine the shape of the object to be measured, wherein, the biaxial goniometers constituting the optical system and the uniaxial straight-ahead stage are subjected to fully-closed feedback control (follow-up control) under which output from the QPD is input directly into an axis drive motor, the biaxial goniometers constituting the sample system are subjected to semi-closed feedback control (constant value control), and wherein a piezo-driven two-dimensional planar fine-motion stage is arranged at the movable part of the biaxial goniometers constituting the optical system, the QPD is mounted at a movable part of the planar fine-motion stage, and when the QPD output becomes minimum, encoder outputs on all the axes and a piezo-drive signal for the planar fine-motion stage are acquired simultaneously, measurement point coordinates and normal vectors derived from the encoder outputs are corrected with the piezo-drive signal for the planar fine-motion stage, thereby to eliminate influence of steady-state deviation in the goniometer control system (Claim 3).

In the foregoing arrangement, it is preferred that only the QPD is mounted at the movable part of the planar fine-motion stage (Claim 4).

Advantageous Effects of Invention

The foregoing normal vector tracing ultra-precision shape measurement method of the present invention provides advantages of: realizing shape measurement of a wide variety of free-form surfaces, ranging from surfaces with curvature radiuses of 10 mm or more to planar surfaces, in a short time and with a measurement precision of 1 nm PV or more (in an angle resolution of 0.1 μrad or less); placing no limit on size of an object to be measured; and allowing non-contact measurement without the use of a reference surface, and others.

Specifically, the present invention provides a normal vector tracing ultra-precision shape measurement method, including the steps of: preparing at least two pairs of biaxial goniometers and a uniaxial straight-ahead stage changing a distance between rotation centers of the goniometers, wherein one pair of goniometers constitutes a sample system and holds an object to be measured at a movable part thereof, and the other pair of goniometers constitutes an optical system and has at a movable part thereof a light source and a light detector using a quartered photodiode (QPD) based on a null method; controlling the two pairs of biaxial goniometers to overlap completely a measurement beam emitted from the light source and a reflection beam reflected on the surface of the object to be measured; controlling the uniaxial straight-ahead stage to keep constant a light path length L between the light detector and the surface of the object to be measured; and measuring a normal vector at an arbitrary measurement point on the surface of the object to be measured to determine the shape of the object to be measured, wherein, of the two pairs of biaxial goniometers and the uniaxial straight-ahead stage, one pair of biaxial goniometers and the uniaxial straight-ahead stage are subjected to fully-closed feedback control under which output from the QPD is input directly into an axis drive motor, and the remaining pair of biaxial goniometers are subjected to semi-closed feedback control, thereby realizing quick measurement of a normal vector on each of the measurement point coordinates and short-time measurement of the surface shape of the object to be measured, wherein outputs from the encoders for all the axes and output from the QPD are acquired at the same time, and wherein the measurement point coordinates and the normal vectors derived from the outputs from the encoders are corrected with the QPD output, thereby allowing precision shape measurement without influence of steady-state deviation in the goniometer control system. According to the measurement method, high-speed measurement is achieved by realizing tri-axial fully-closed feedback control under which the QPD output is input directly into drive motors for one pair of biaxial goniometers such that the goniometers can constantly trace the normal vectors, and the QPD output is also input directly into the straight-ahead stage keeping constant the light path length L, and measurement points are specified and determined by the remaining biaxial goniometers. As in the foregoing, shortening of measurement time and improvement of shape measurement precision can be realized by reading simultaneously the five-axis encoder outputs and the QPD output while tracing the normal vectors.

In particular, the biaxial goniometers constituting the optical system and the uniaxial straight-ahead stage are subjected to fully-closed feedback control under which output from the QPD is input directly into the axis drive motor, and the biaxial goniometers constituting the sample system are subjected to semi-closed feedback control, thereby to allow independent and quick tracing of the normal vectors regardless of the object to be measured.

In another aspect of the normal vector tracing ultra-precision shape measurement method of the present invention, the biaxial goniometers constituting the optical system and the uniaxial straight-ahead stage are subjected to fully-closed feedback control under which output from the QPD is input directly into the axis drive motor, the biaxial goniometers constituting the sample system are subjected to semi-closed feedback control, the piezo-driven two-dimensional planar fine-motion stage is arranged at the movable part of the biaxial goniometers constituting the optical system, the QPD is mounted at a movable part of the planar fine-motion stage, and when the QPD output becomes minimum, encoder outputs on all the axes and a piezo-drive signal for the planar fine-motion stage are acquired simultaneously, measurement point coordinates and normal vectors derived from the encoder outputs are corrected with the piezo-drive signal for the planar fine-motion stage, thereby to allow precision shape measurement based on a null method without influence of steady-state deviation in the goniometer control system.

In addition, only the QPD is mounted at the movable part of the planar fine-motion stage to save weight of a part of the stage subjected to piezo drive and bring about a higher response speed. This makes it possible to move the QPD in a plane at a high speed to cancel out steady-state deviation in the goniometer control system, thereby allowing short-time precision shape measurement based on a null method.

BRIEF DESCRIPTION OF THE DRAWINGS

FIG. 7 (b) is a graph of steady-state position deviation on A1 axis.

FIG. 9 (a) is a graph of a profile of the entire shape, FIG. 9 (b) is a graph of shape errors with respect to an ideal shape, and FIG. 9 (c) is a graph of repeatability measurement error.

FIG. 11 (a) is a graph of a profile of the entire shape, FIG. 11 (b) is a graph of shape error with respect to an ideal shape, and FIG. 11 (c) is a graph of repeatability measurement error.

FIG. 12 (a) shows results of measurement by the device (using the shape measurement method of the present invention), FIG. 12 (b) shows results of measurement by a phase-shift interferometer (GPI manufactured by Zygo Corporation), and FIG. 12 (c) shows differences between results of measurement by the device and the phase-shift interferometer (GPI manufactured by Zygo Corporation).

DESCRIPTION OF EMBODIMENTS

Figure 1:
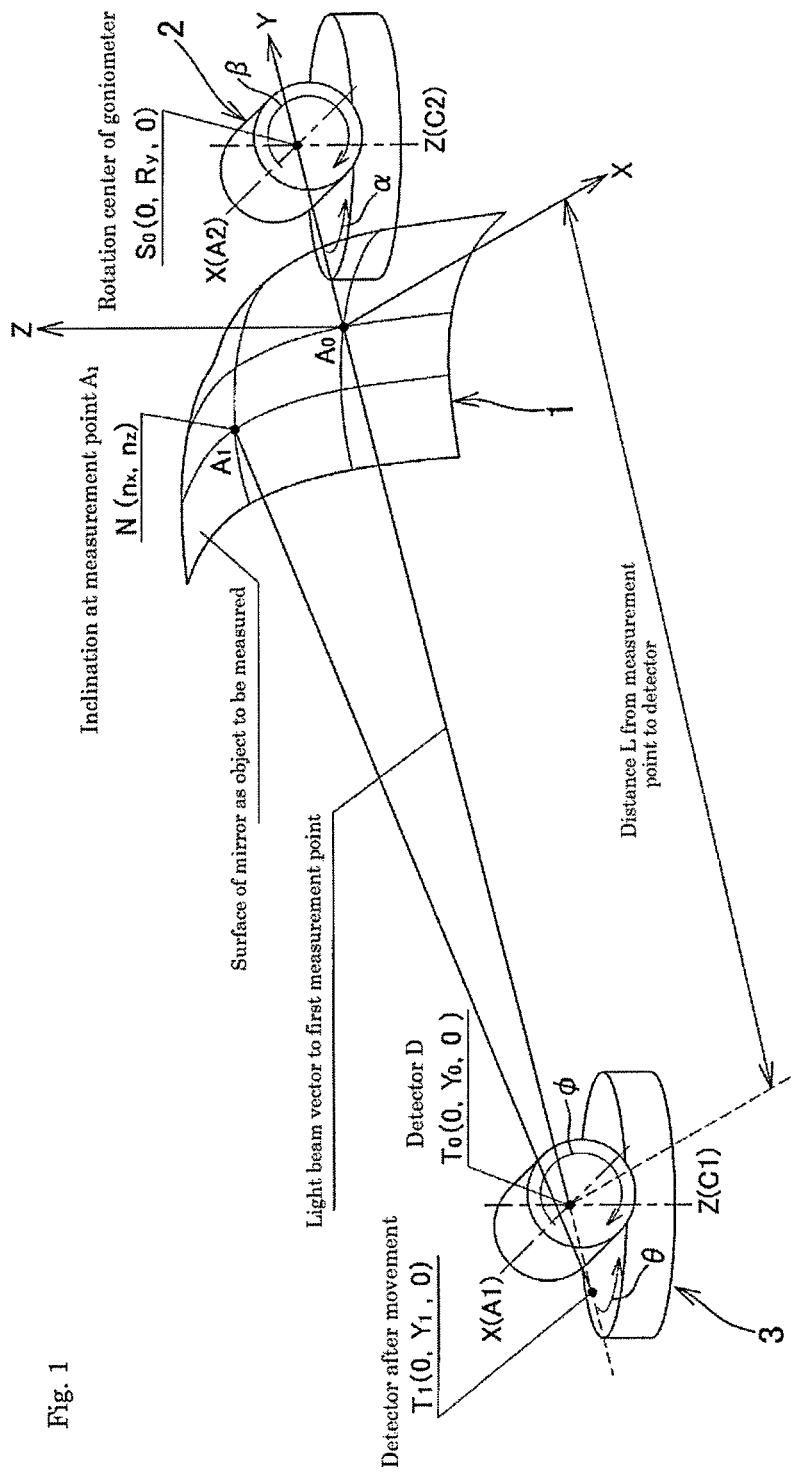
FIG. 1 is a diagram showing the principle of a method for measuring coordinates and a normal vector on a surface of an object to be measured.
Figure 2:
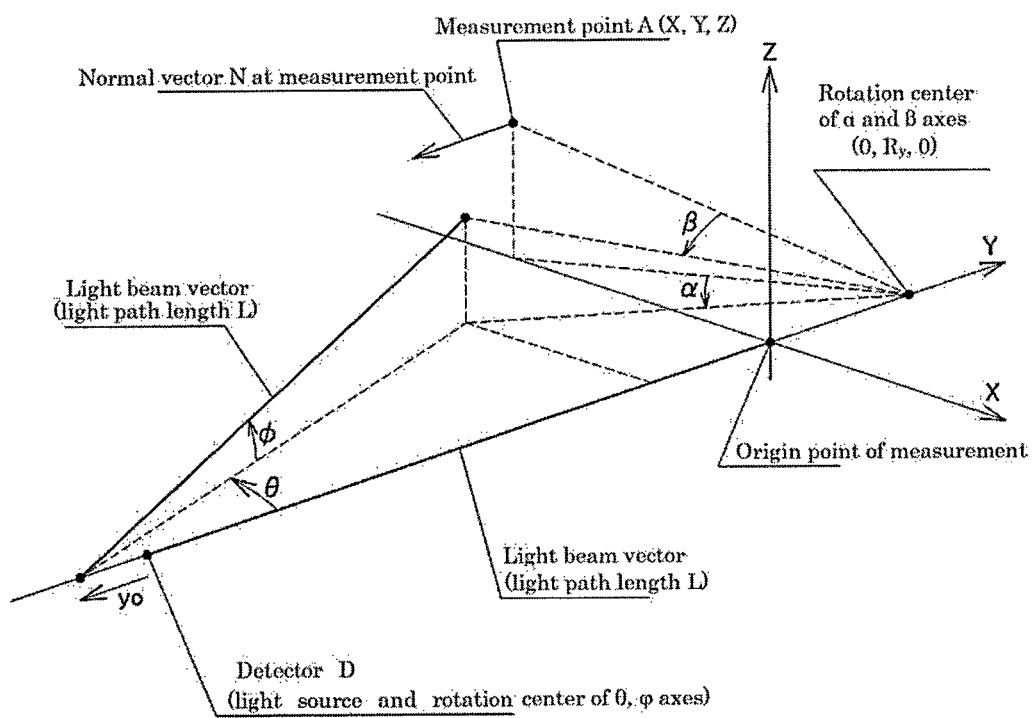
FIG. 2 is a diagram describing relationships between angles of two pairs of biaxial goniometers and the normal vector and the position coordinates.

Next, the present invention will be described in more detail according to an embodiment shown in the attached drawings. FIGS. 1 and 2 show the principle of measuring a normal vector by the measurement method of the present invention, where the straight-ahead moving property of light is utilized to measure a normal vector at each point on a surface of an object to be measured 1. Specifically, the embodiment includes two pairs of biaxial goniometers and a uniaxial straight-ahead movement (Y axis) changing a distance between rotation centers of the goniometers. One pair of goniometers constitutes a sample system 2 and holds the object to be measured 1 at a movable part thereof, and the other pair of goniometers constitutes an optical system 3 and has a light source and a detector D at a movable part thereof. The light source and the detector D move in an integrated manner.

Figure 3:
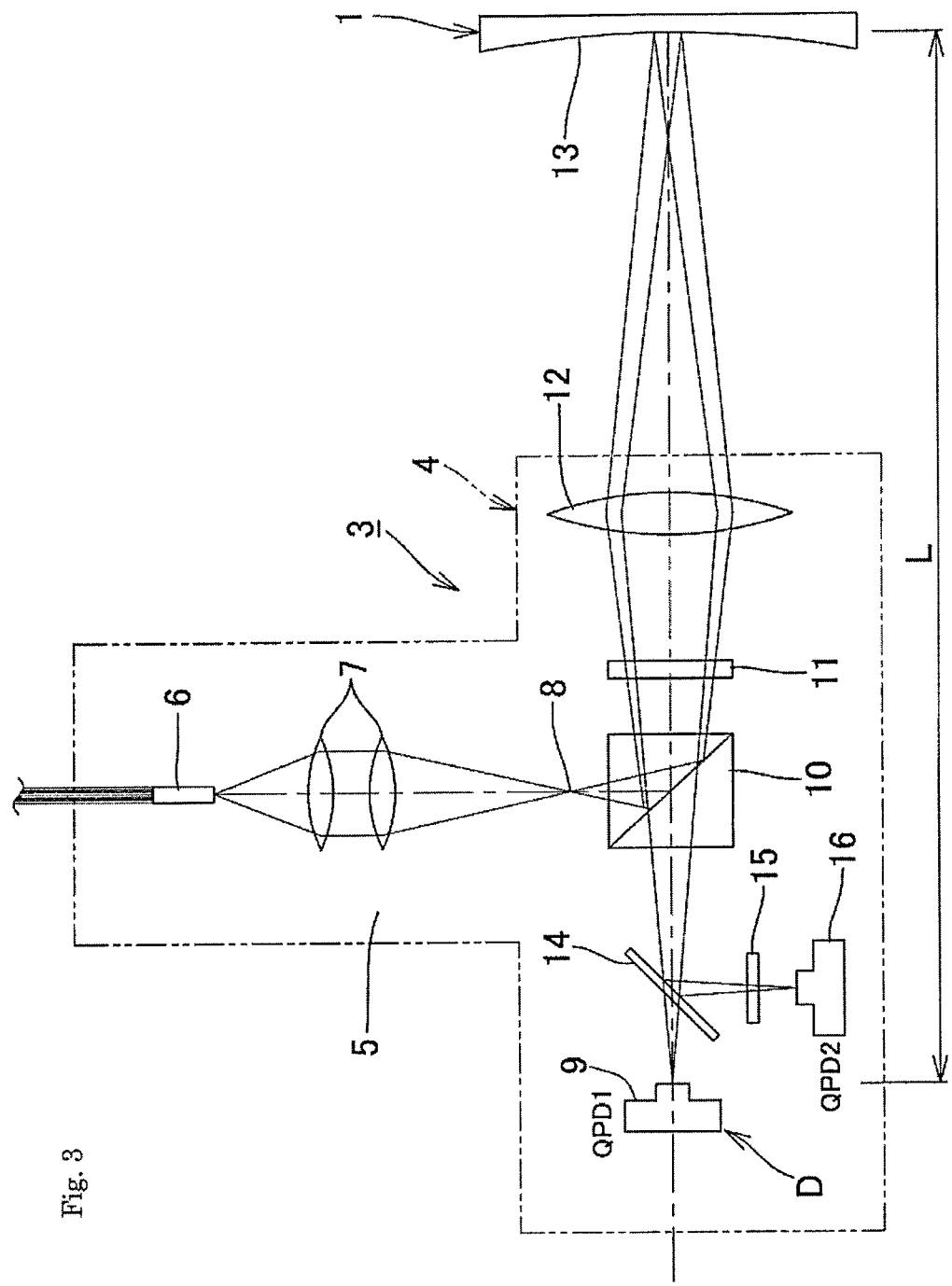
FIG. 3 is a diagram describing an optical head constituting an optical system.

An optical head 4 constituting the optical system 3 will be described with reference to FIG. 3. The optical head 4 is formed by aligning and arranging various optical devices on one base stand 5. Laser light emitted from a horizontal single-mode oscillation He—Ne laser is passed through an optical isolator, and guided by optical fiber 6 fixed at an output end thereof on the base stand 5, and collected on collimator lenses 7 arranged opposed to the output end of the optical fiber 6, thereby producing a point light source 8. In a coordinate system of normal vector measurement, rotation around X axis is defined as φ and rotation around Z axis is defined as θ, with the origin point at a detector 9. The laser light collected on the collimator lenses 7 is bent 90° by a beam splitter 10, and passed through a ¼ wavelength plate 11 and collected on a collecting lens 12, and then entered into the object to be measured 1 at predetermined beam spots. The ¼ wavelength plate 11 has a deflection surface fixed at a 45°-rotated position to convert straight-deflected light into round-deflected light.

Then, the laser light is reflected on a measured surface 13 of the object to be measured 1, and moves straight to the beam splitter 10 through the collecting lens 12, passes through a half mirror 14, and is received by the detector 9, thereby to perform normal line measurement. Meanwhile, the laser light split by the half mirror 14 is received by a detector 16 through a cylindrical lens 15, thereby to measure changes in distance from the measured surface 13. In this arrangement, the optical axis position detector 9 and the distance detector 16 are formed by a quartered photodiode (QPD). The detector 16 (QPD2) measuring changes in distance from the detector 9 (QPD1) to the measured surface 13, is mounted on the base stand 5 with an optical axis along the direction of Z axis. The laser light from the beam splitter 10 is split at a ratio of 1:1 by the half mirror 14 such that one part of the light is directed to the detector 9 and the other part is directed to the detector 16. The laser light split and directed to the detector 16 is used to form an image on the detector 16 through the cylindrical lens 15. The principle of distance measurement by the cylindrical lens 15 and the QPD2 (detector 16) is described in detail in Patent Literature 1.

The method for measuring a surface shape of an object to be measured in the present invention will be described below. The rotation center of the biaxial goniometers as the sample system 2 is immobile during the measurement, and a Y-axis coordinate $R_y$ of the rotation center takes a constant value. Further, during the measurement, it is necessary to adjust and keep constant the light path length L from the surface of the object to be measured to the detector D using a uniaxial straight-ahead movement. First, a normal vector at a measurement reference point $A_0$ is measured by two pairs of biaxial rotational movements (θ, φ) and (α, β). For the measurement, the light path length L is adjusted to overlap incident light at the measurement reference point $A_0$ on the surface of the object to be measured and reflection light at the same point. At that time, a normal vector at that point is equal to the direction of movement of the light beam. Taking an origin point (0,0,0) at the first measurement reference point $A_0$, the movement direction of the light beam coinciding with the normal vector is aligned with Y axis as a coordinate system for position adjustment of the light source, and the rotation center of the sample system 2 is set on the axis. In this arrangement, the position coordinates of the optical system 3 are defined as $T_0$ (0, $Y_0$, 0), and the angles formed by rotation around Z axis and rotation around X axis in the measurement system and the angles formed by rotation around Z axis and rotation around X axis in the sample system 2 are defined as (θ, φ) (0,0) and (α, β)=(0,0). The coordinates of the rotation center of the sample system 2 are defined as $S_0$ (0, $R_y$, 0). Then, the light path length L, the measurement reference point $A_0$, and rotation center displacement $R_y$ are measured using other measurement devices.

To determine a normal vector at next measurement point $A_1$ (x, z), incident light is adjusted to come near $A_1$ by the biaxial rotational movements (θ, φ). Then, the incident light and reflected light are aligned by the biaxial rotational movements (α, β) and the normal vector is measured by a null method using the QPD (detector D). In this arrangement, on measurement of the normal vector at the first measurement point $A_1$ (x, z), the position coordinates of the optical system 3 are defined as $T_1$ ($X_1, Y_1, Z_1$)=(0, $Y_0$+$yo_1$, 0), and the angles formed by rotation around Z axis and rotation around X axis in the optical system 3 and the angles formed by the rotation around Z axis and rotation around X axis in the sample system 2 are defined as (θ, φ)=($θ_1, φ_1$) and (α, β)=($α_1, β_1$). In this arrangement, displacements and angle variations ($yo_1, θ_1, φ_1, α_1, β_1$) are set as normal vector measurement values. A normal vector at a measurement point is determined by angle variations in the optical system 3 and the sample system 2, and the inclination of the surface of the object to be measured is determined by the normal vector. In addition, coordinates at a normal vector measurement point are determined by displacements and angle variations in the optical system, angle variations in the sample system, the light path length L, and the rotation center displacement $R_y$.

That is, the constant values L and $R_y$ and the normal vector measurement values (θ, φ, α, β, yo) can be used to derive measurement point A ($X_A, Z_A$) on the surface of the object to be measured by Equation 1 and normal vector N ($n_X, n_Z$) by Equation 2 as follows:

$$X_A = f(\theta, \varphi, \alpha, \beta, yo, L, R_y) \qquad \text{[Equation 1]}$$
$$Z_A = g(\theta, \varphi, \alpha, \beta, yo, L, R_y)$$

$$N = \begin{pmatrix} n_X \\ n_Z \end{pmatrix} = \begin{pmatrix} \tan(\alpha - \theta) \\ \tan(\beta - \varphi) \end{pmatrix} \qquad \text{[Equation 2]}$$

In the measurement method of the present invention, a large number of measurement point coordinates and measurement values of normal vectors of the coordinates are used to approximate a measured surface shape by the Fourier series and calculate Fourier series expansion coefficients with minimum slope residuals at the measurement points by the method of least squares, thereby to determine uniquely the measured surface shape. In this arrangement, a slope (inclination) of the surface at a measurement point can be calculated from a normal vector. In the measurement method of the present invention, before specifying a Fourier series shape function using actual measurement data, an ideal shape function is used to find an order n of Fourier series expansion in which both shape residuals and slope residuals are generated with precision of a predetermined or lower value, thereby assuring that calculation error falls within a predetermined range. In this arrangement, an inclination of the surface at a certain point can be easily calculated by first-order differentiation of the ideal shape function.

In general, the surface shape of an object to be measured may be a spherical, cylindrical, paraboloidal, ellipsoidal, or aspheric surface, or may be a free-form surface that cannot be expressed by an analytical function but can be accurately represented by a spline function or the like at designing of an optical system, and the object is processed with an ultra-precision to approximate to an ideal shape function. Therefore, even if ideal data derived from the ideal shape function is used to determine the order n such that both shape residuals and slope residuals are generated with precision of a predetermined or lower value, the practical value of the measurement method of the present invention is not deteriorated. In addition, once the order n of Fourier series expansion is determined, coordinates and normal vectors are measured at least n measurement points in the case of two-dimensional shape measurement or at least n×n measurement points in the case of three-dimensional shape measurement. This makes it possible to obtain a Fourier series shape function using actual measurement data with assurance of calculation error. In general, if an arbitrary curved surface is approximated by the method of least squares using Fourier series expansion, coordinate (shape) residuals become minimum. In the measurement method of the present invention, however, both shape residuals and slope residuals become minimum in accordance with a normal vector shape measurement method.

The series of steps for deriving a shape as described above will be referred to as shape derivation algorithm P. The four angle data ($\theta$, $\phi$, $\alpha$, $\beta$) obtained from the two pairs of biaxial goniometers and the one distance data (yo) obtained from the uniaxial straight-ahead stage, are acquired at each measurement point. That is, a set of absolute measurement values ($\theta_i$, $\phi_i$, $\alpha_i$, $\beta_i$, $yo_i$) is acquired at each measurement point A. Then, these actual measurement data are used to derive a shape by the shape derivation algorithm P. In this arrangement, the shape derived with a specific value of the light path length L is designated as P(L). The light path length L is separately measured in the initial state by a length measuring machine, as a distance from the origin point to the rotation center of the optical system 3, thereby to acquire an actual measurement value $L_0$ with a far larger measurement error than a measurement precision required for the object to be measured. The uniaxial straight-ahead stage can be driven to keep constant the light path length L at each measurement point, by subjecting the quartered photodiode (QPD2) for distance monitoring constituting the detector 16 to feedback control to keep constant output from the QPD2 (refer to Patent Literature 2). Alternatively, another mechanism for monitoring the light path length L may be incorporated into the shape measurement device.

In the measurement method of the present invention, the two pairs of biaxial goniometers are controlled to overlap completely a measurement beam emitted from the light source and a reflection beam reflected on the surface of the object to be measured 1, and the uniaxial straight-ahead stage is controlled to keep constant the light path length L between the light detector D and the surface of the object to be measured, and the surface of the object to be measured is measured at arbitrary measurement points, thereby to acquire a set of measurement values including four angle data obtained from the two pairs of biaxial goniometers and one distance data obtained from the uniaxial straight-ahead stage, at each of the measurement points. The measurement values ($\theta$, $\phi$, $\alpha$, $\beta$, yo) use measurement values obtained as displacements from the origin point at the measurement reference point $A_0$ or measurement values obtained as differences between former and latter measurement points. In addition, the shape is derived from the set of measurement values corresponding to the number of the measurement points, by the shape derivation algorithm P. At that time, a plurality of shapes P(L) is derived with the light path length L as a variable, and then a true light path length $L_c$ and a converged shape $P(L_c)$ are calculated using convergence of shape variations.

Figure 5:
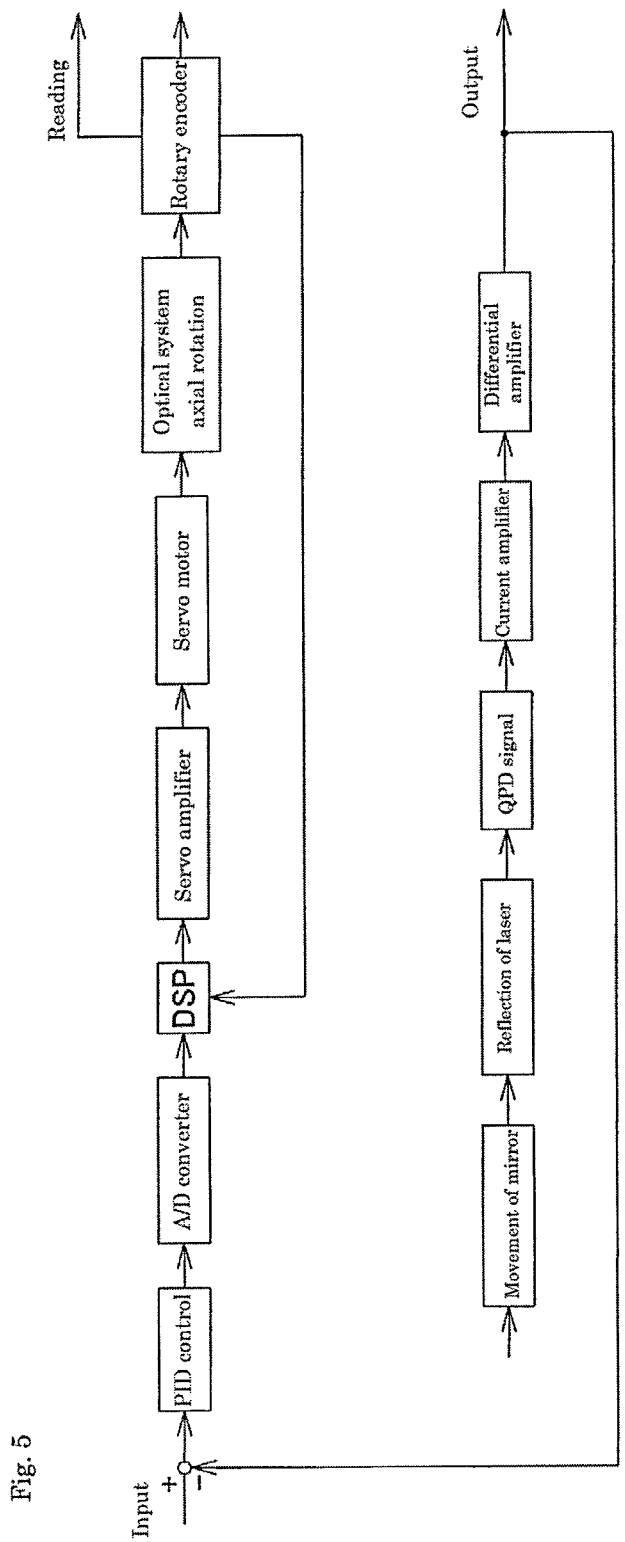
FIG. 5 is a block diagram of fully-closed feedback control.
Figure 6:
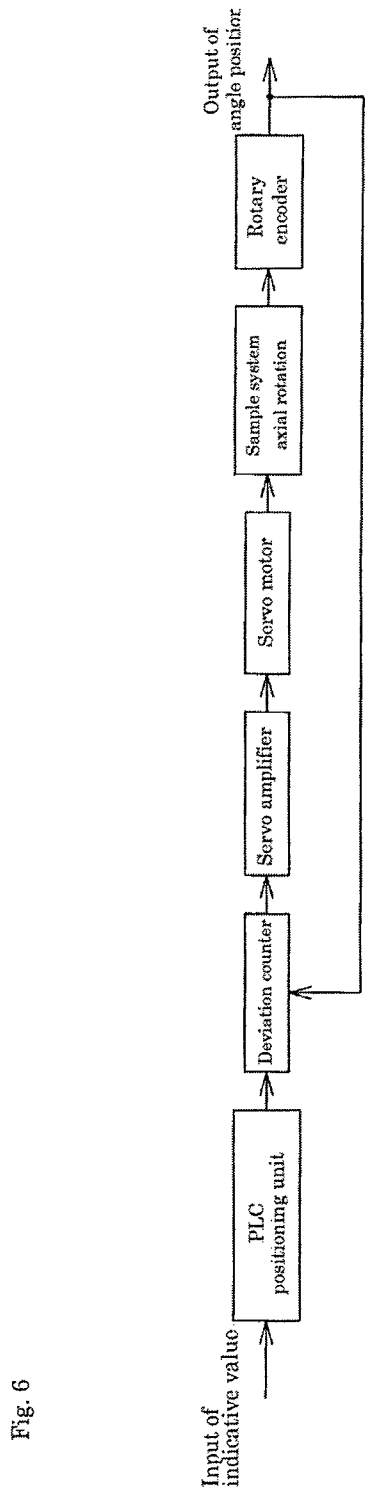
FIG. 6 is a block diagram of semi-closed feedback control.

Next, a technique for controlling drive axes in the normal vector tracing ultra-precision shape measurement method according to the present invention will be described with reference to FIGS. 4 to 6. As described above, the measurement device of the present invention controls the two pairs of biaxial goniometers to overlap completely a measurement beam emitted from the light source and a reflection beam reflected on the surface of the object to be measured 1, and controls the uniaxial straight-ahead stage to keep constant the light path length L between the light detector D and the surface of the object to be measured, thereby to measure the surface of the object to be measured at arbitrary measurement points. Here, the technique for control will be described with reference to an example of a horizontal shape measurement device (refer to FIG. 4) in which a light beam vector to the first measurement point is set along the horizontal direction. In the coordinate system of this embodiment, the light beam vector to the first measurement point is directed along Y axis, and the perpendicular direction is set along Z axis, and axes of rotations around X, Y, and Z axes are defined as A, B, and C axes, respectively. For the sake of description, the axes of rotations around X and Z axes in the optical system 3 are defined as A1 and C1 axes, respectively, and the axes of rotations around X and Z axes in the sample system 2 are defined as A2 and C2 axes, respectively.

On a horizontal shape measurement device, it is difficult to support a large-sized object to be measured without deformation. However, the horizontal shape measurement device is capable of reliable shape measurement using stable C axis, and provides an advantage that the absolute value of the light path length L can be determined in a relatively easy manner. Meanwhile, a vertical shape measurement device not shown has a higher profile but provides an advantage that an object to be measured can be easily supported. Devices of any form are aimed at meeting an angle resolution of $10^{-7}$ rad or less, a measurement shape precision of 1 nm PV, and a measurement time of 30 msec or less at a measurement point.

Figure 4:
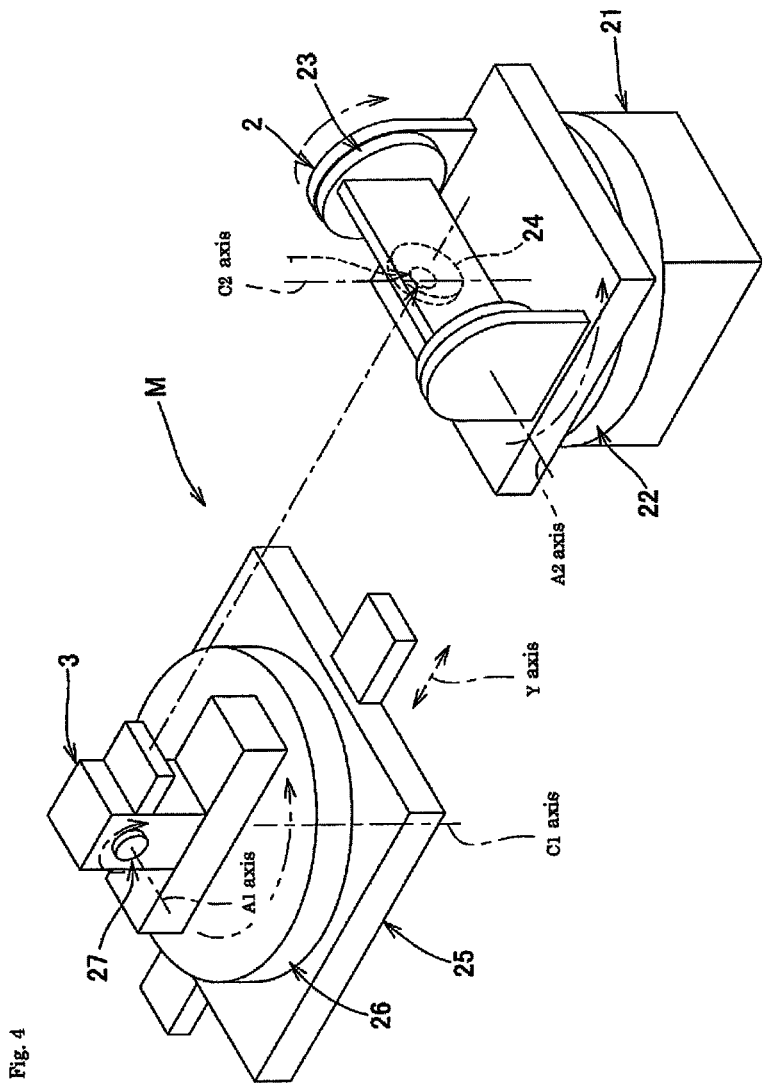
FIG. 4 is a perpendicular view of a conceptual structure of a horizontal shape measurement device of the present invention.

As shown in FIG. 4, a horizontal shape measurement device M has the sample system 2 in which a C2-axis goniometer 22 is placed on a fixed stand 21, an A2-axis goniometer 23 is provided at a movable part of the C2-axis goniometer 22, and a holder 24 is provided on the A2-axis goniometer 23 to hold the object to be measured 1. Alternatively, the holder 24 may be replaced with a B2-axis goniometer for efficient measurement of an object to be measured 1 which is of rotationally symmetric shape, such that the holder is provided at a movable part of the B2-axis goniometer.

Meanwhile, in the optical system 3, a C1-axis goniometer 26 is placed on a table of the straight-ahead stage 25 along the direction of Y axis, an A1-axis goniometer 27 is provided at a movable part of the C1-axis goniometer 26, and the optical head 4 with the light source, the detector D, and the like, is provided at a movable part of the A1-axis goniometer 27.

In the present invention, of the two pairs of biaxial goniometers and the uniaxial straight-ahead stage, one pair of biaxial goniometers and the uniaxial straight-ahead stage are subjected to fully-closed feedback control under which output from the light detector is input directly into the axis drive motor, and the remaining pair of biaxial goniometers is subjected to semi-closed feedback control. Specifically, the biaxial goniometers constituting the optical system 3 and the uniaxial straight-ahead stage are subjected to fully-closed feedback control under which output from the light detector D is input directly into the axis drive motor, and the biaxial goniometers constituting the sample system 2 are subjected to semi-closed feedback control.

More specifically, the C1-axis goniometer 26, the A1-axis goniometer 27, and the straight-ahead stage 25 are subjected to fully-closed feedback control, and the C2-axis goniometer 22 and the A2-axis goniometer 23 are subjected to semi-closed feedback control. FIG. 5 is a block diagram of fully-closed feedback control, and FIG. 6 is a block diagram of semi-closed feedback control. However, these block diagrams merely show examples.

The fully-closed feedback control is a typical servo-system follow-up control. Under the fully-closed feedback control, the position or angle of an encoder, not output from the encoder, is detected by another sensor (QPD in this arrangement), and a detection signal is fed back to a servo motor. For higher-speed operations, the fully-closed feedback control includes a sub-loop in which a Digital Signal Processor (DSP) operates the servo motor via a servo amplifier, and the encoder reads the angles of rotations around the axes of the goniometers and the position of the straight-ahead stage, and feeds the read data back to the DSP. The fully-closed feedback control is also a typical servo-based feedback control under which a laser beam is reflected in accordance with movement of a mirror as a typical object to be measured, and the QPD detects the movement of the mirror and feeds the detected data back to a Proportional Integral Derivative (PID) via current amplifiers and differential amplifiers. In the case of the fully-closed feedback control of the straight-ahead stage 25, the servo motor is changed to a linear motor, the rotation around the axis is changed to a straight-ahead movement, and the rotary encoder is changed to a linear encoder in FIG. 5. Under the follow-up control, a normal vector at each of measurement points on the mirror as an object to be measured is determined to ensure coincidence of incident and reflected laser beams. With constant coincidence of the incident and reflected laser beams, it is possible to read a normal vector at each of the measurement points by the two pairs of biaxial goniometers. In addition, when the fully-closed feedback control is executed such that the uniaxial straight-ahead stage keeps a constant space between the detector 9 (QPD1) and the measured surface 13 of the object to be measured 1, it is possible to know the distance L between the detector 9 and the measured surface 13 and the normal vectors from readings of the straight-ahead axis linear encoder and the rotary encoders of the goniometers, thereby determining the measurement point coordinates.

The semi-closed feedback control is a constant-value control used for positioning of general Computerized Numerically Controlled (CNC) machine tools and the like. Under the semi-closed feedback control, coordinate values and angles as indicative values are input into a Power Line Communication (PLC) positioning unit for conversion into a drive signal for a servo motor, a difference of the signal from encoder output is calculated at a deviation counter, and the servo motor is driven via the servo amplifier. All the machine components including the servo amplifier are controlled according to a digital signal. Under the feed-back control, the encoder detects the movement of the axe of the servo motor or the position of the straight-ahead stage, and outputs the detected data to the deviation counter for positioning.

It is necessary to decide which of the optical system 3 and the sample system 2 to be subjected to fully-closed feedback control, depending on the object to be measured. Specifically, it is necessary to determine which of the optical system 3 and the sample system 2 is to be more preferably subjected to control with a larger number of accelerations and decelerations (fully-closed control). In this embodiment, the optical system 3 is subjected to fully-closed control with a higher priority placed on general versatility of the shape measurement device. This makes it easy to move the stage in the sample system according to the size of the object to be measured, thereby providing improved usability.

On an actual shape measurement device, the A, B, and C axes may not be accurately orthogonal to one another due to errors involved in shape precision and assembly of device components, thereby causing decentering of the rotation centers. In addition, these errors may vary with temperature. Accordingly, such errors specific to the device need to be compiled in a database for correction of actual measurement values. These error correction techniques are established in the fields of precision machine tools and semiconductor manufacturing devices.

Figure 7:
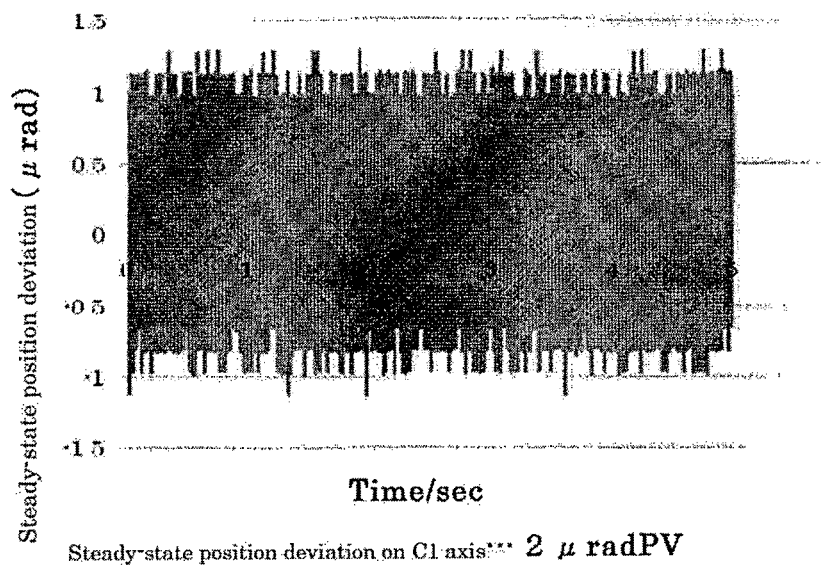
FIG. 7 (a) is a graph of steady-state position deviation on C1 axis.
Figure 7:
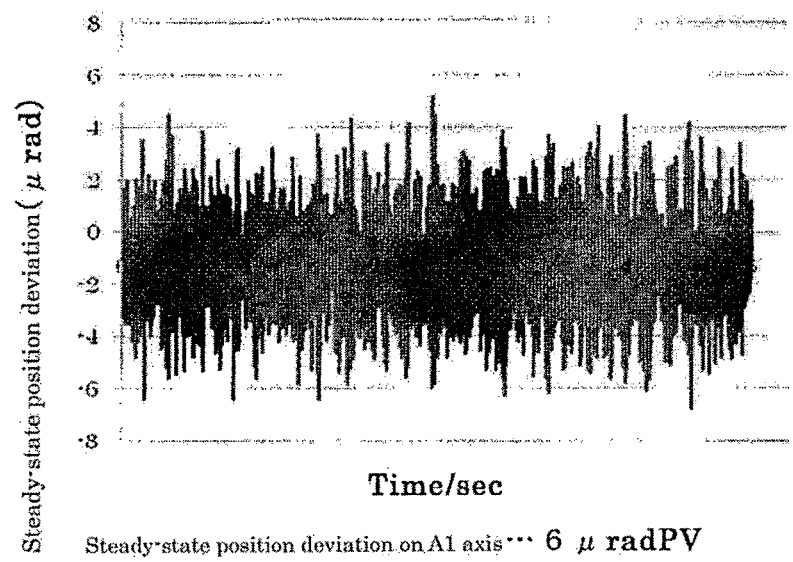

However, even if high-precision control is performed using high-precision goniometers and encoders, some response delay may occur due to inertial masses of movable parts. In general, if a stable control system in a steady state includes a deviation of an actual control value from a target value, the deviation is referred to as a steady-state deviation (or an offset). Under control based on a null method using QPD, the influence of steady-state position deviation appears as errors in measurement of normal vectors and measurement points, which places a limit on precision of shape measurement. If the steady-state position deviation is large, a desired shape measurement precision cannot be satisfied. Although it depends on the distance L from the QPD to the measured surface, the goniometers need to have an angle precision of 0.1 μrad to obtain a shape measurement precision of 1 nm PV. In this regard, FIG. 7 shows results of measurement of the steady-state position deviations of the C1-axis goniometer 26 and the A1-axis goniometer 27 constituting the optical system 3 of the shape measurement device in this embodiment. FIG. 7 (a) shows the steady-state position deviation (about 2 μrad PV) of the C1-axis goniometer 27, and FIG. 7 (b) shows the steady-state position deviation (about 6 μrad PV) of the A1-axis goniometer 27. It is understood from the graphs that both of the steady-state position deviations vary within a range of several tens of Hz.

Meanwhile, in the optical system of the shape measurement device in this embodiment, a laser beam can be detected at an angle decentered by ±20 to 30 μrad from the center of the QPD. With increasing proximity to the center of the QPD, the precision becomes higher due to the structure of the QPD, and the linearity of output becomes more favorable with respect to displacement of a laser beam. At least within a range of ±several μrad, the position (angle) of a laser beam can be detected with an extremely high precision. In this arrangement, encoder outputs on all the axes and QPD output show accurate values in each moment, although the outputs vary from time to time under influence of steady-state position deviation. Accordingly, the encoder outputs on all the axes and the QPD output are obtained simultaneously, and measurement position coordinates and normal vectors derived from the encoder outputs are corrected by the QPD output, thereby to eliminate the influence of steady-state deviation in the goniometer control system.

Figure 8:
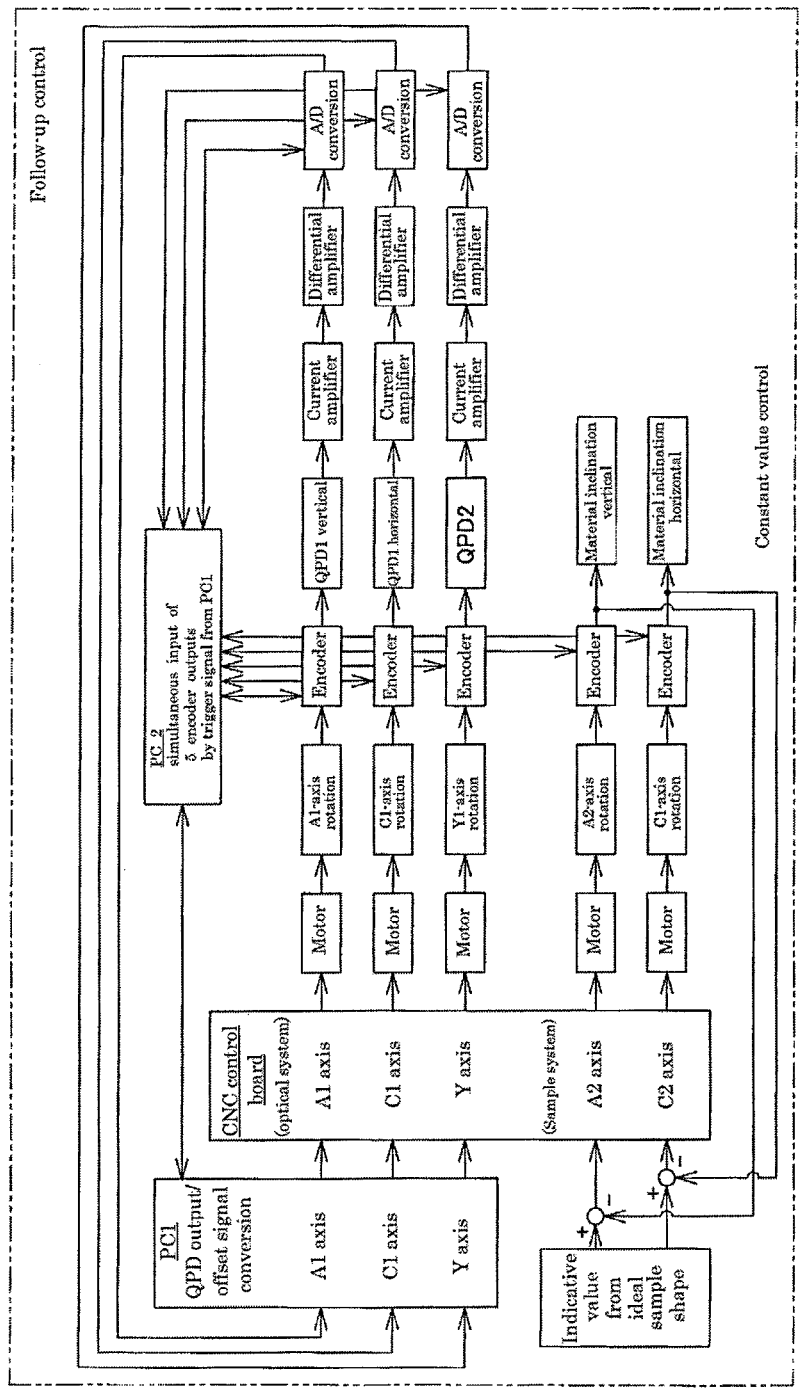
FIG. 8 is a block diagram of a five-axis simultaneous control system of the shape measurement device of the present invention.

FIG. 8 is a block diagram of a five-axis simultaneous control system of the shape measurement device which includes the fully-closed feedback control (follow-up control) of the optical system 3 and the semi-closed feedback control (constant value control) of the sample system 2, and further includes an additional function of acquiring simultaneously the encoder outputs on all the axes and the QPD output. Using a null method with coincidence of light paths of incident and reflected light beams provides an advantage that it is possible to avoid influences of differences in sensitivity of the QPD and refractive-index distribution of the light paths. However, if the steady-state deviation arising in the follow-up control with tracing of normal vectors is larger than a target precision, the five-axis encoder outputs and the QPD output are simultaneously taken into a personal computer PC2 according to a trigger signal issued from a personal computer PC1, and the coordinates at the measurement points and the measurement values of the normal vectors are calculated. In this case, although the null method cannot be perfectly practiced, the influence of the steady-state deviation is completely ignorable.

A CNC control board generates control signals for driving the motors for the goniometers on all the axes. The sample system 2 is subjected to constant-value control under which indicative values determined based on the ideal shape of the object to be measured are input into the CNC control board, the motors for the A2 axis and the C2 axis are driven, and the encoders detect the rotation angles of the motors and feed the detected values back to the CNC control board to keep deviations from the indicative values within allowable ranges. Meanwhile, the optical system 3 is subjected to follow-up control under which the personal computer P1 is used to input control signals for driving the motors for the A1 axis and the C2 axis from output from the QPD1 for position detection, into the CNC control board, such that output from the QPD 1 becomes zero, and the personal computer P1 is used to input a control signal for driving the motor on Y axis from output from the QPD2 for distance detection, into the CNC control board, such that output from the QPD2 becomes zero. As described above, however, the output does not become zero due to the steady-state position deviation of the QPD1. Accordingly, the personal computer P1 is used to send a trigger signal to the personal computer PC2, and the personal computer PC2 is used to read simultaneously the outputs from the encoders on all the axes and the outputs from the QPD1 and the QPD2. Then, the personal computer PC2 is used to correct the encoder outputs with the outputs from the QPD1 and the QPD2 to obtain accurate measurement data of coordinates and normal vectors. Based on the measurement data at all the measurement points, the shape of the object to be measured is derived by the shape derivation algorithm P.

Figure 9:
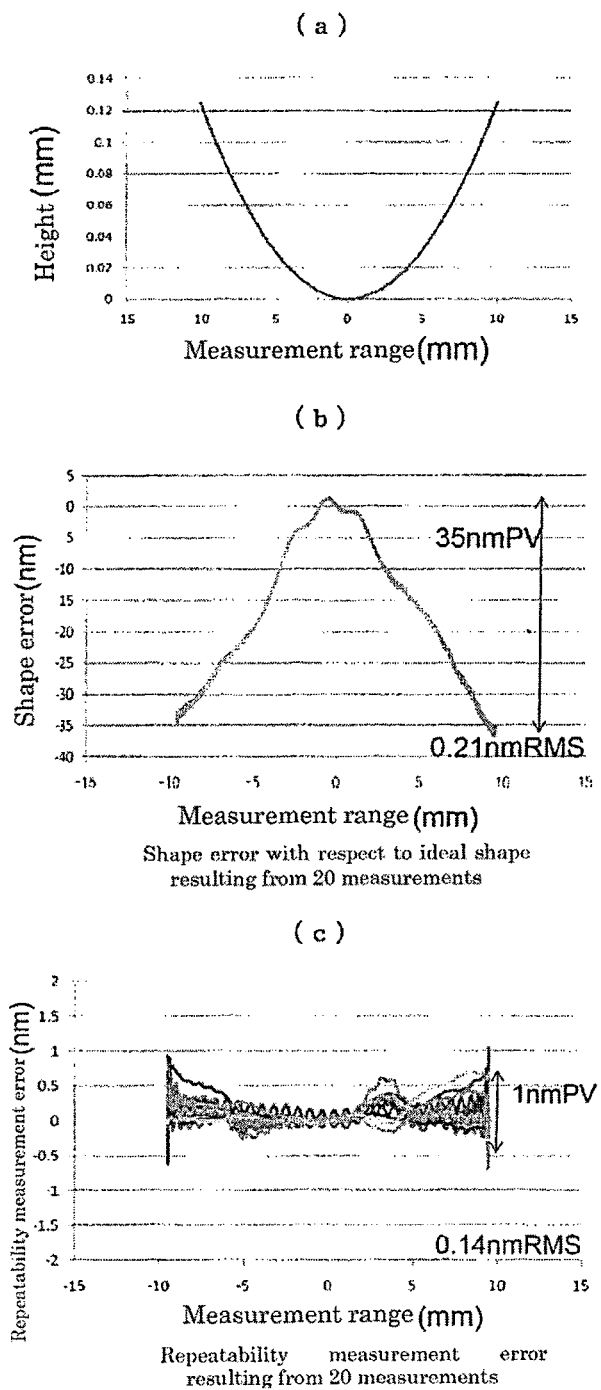
FIG. 9 shows results of two-dimensional shape measurement of a spherical mirror with R=400 mm.

An example of measurement of a spherical mirror with R=400 mm by the normal vector tracing ultra-precision shape measurement method of the present invention will be described with reference to FIGS. 9 to 11. First, the spherical mirror with R=400 mm was subjected to two-dimensional shape measurement along a diameter of the mirror passing through the center of the mirror. FIG. 9 (a) shows a measured shape of the spherical mirror with a range of ±10 mm from the center of the mirror. Since it is not possible to recognize any deviation from the ideal shape at this scale, FIG. 9 (b) shows shape error with respect to the ideal shape resulting from 20 measurements, with reference to the center of the spherical mirror. A peak value of the shape error is 35 nm PV at the central part of the spherical mirror, and the shape error was measured 0.21 nm RMS. The shape error is larger at the central part of the spherical mirror under influence of rotary cutting of the spherical mirror. FIG. 9 (c) shows repeatability measurement error resulting from 20 measurements, which indicates that the repeatability error is 1 nm PV or less and 0.14 nm RMS.

Figure 10:
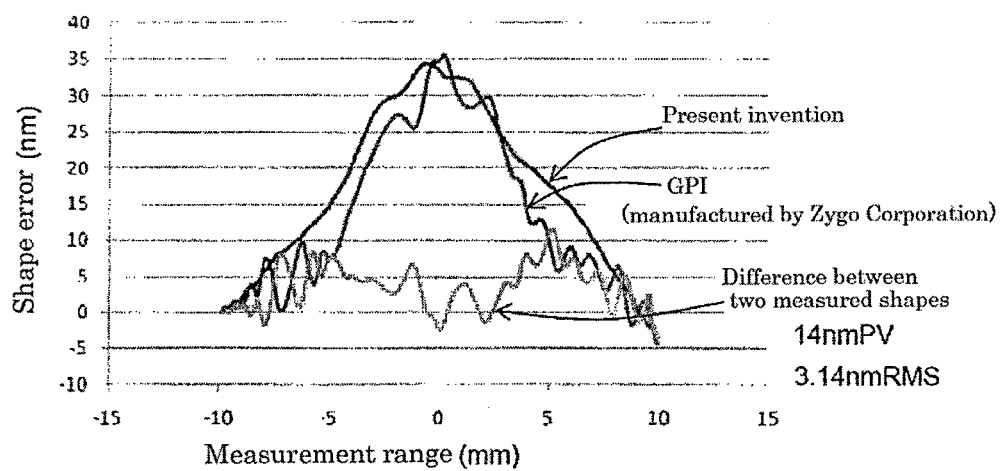
FIG. 10 also shows results of two-dimensional shape measurement, in a graph of shape error in the present invention and shape error in a GPI (manufactured by Zygo Corporation) and differences between shapes measured by the two devices.
Figure 11:
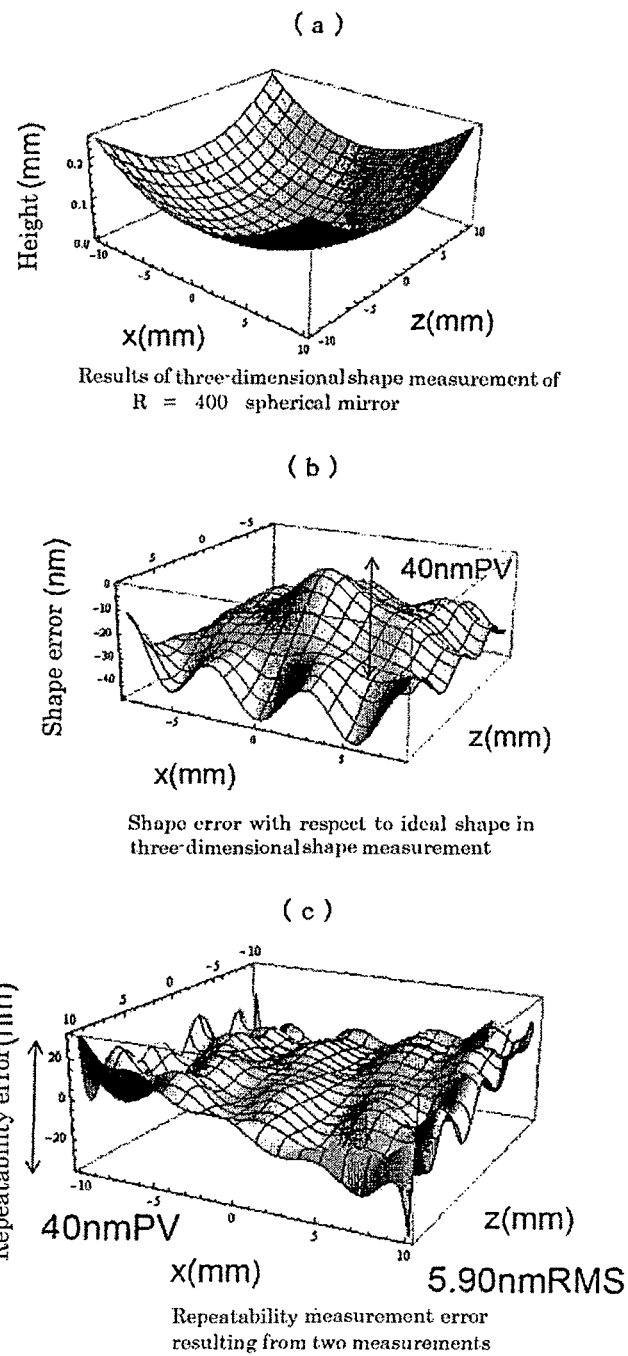
FIG. 11 shows results of three-dimensional shape measurement of a spherical mirror with R=400 mm.

FIG. 10 shows comparison between results of two-dimensional measurement of the foregoing spherical mirror by the shape measurement method of the present invention and by a phase-shift Fizeau interferometer (GPI manufactured by Zygo Corporation). There is a difference of 14 nm PV, 3.14 nm RMS, between two measured shapes, which indicates that the shape measurement precision in the present invention is close to the precision of shape measurement by the phase-shift Fizeau interferometer. Specifically, it has been revealed that there is a consistency within 14 nm PV between the results of shape measurement by the shape measurement method of the present invention and by the phase-shift Fizeau interferometer.

Figure 12:
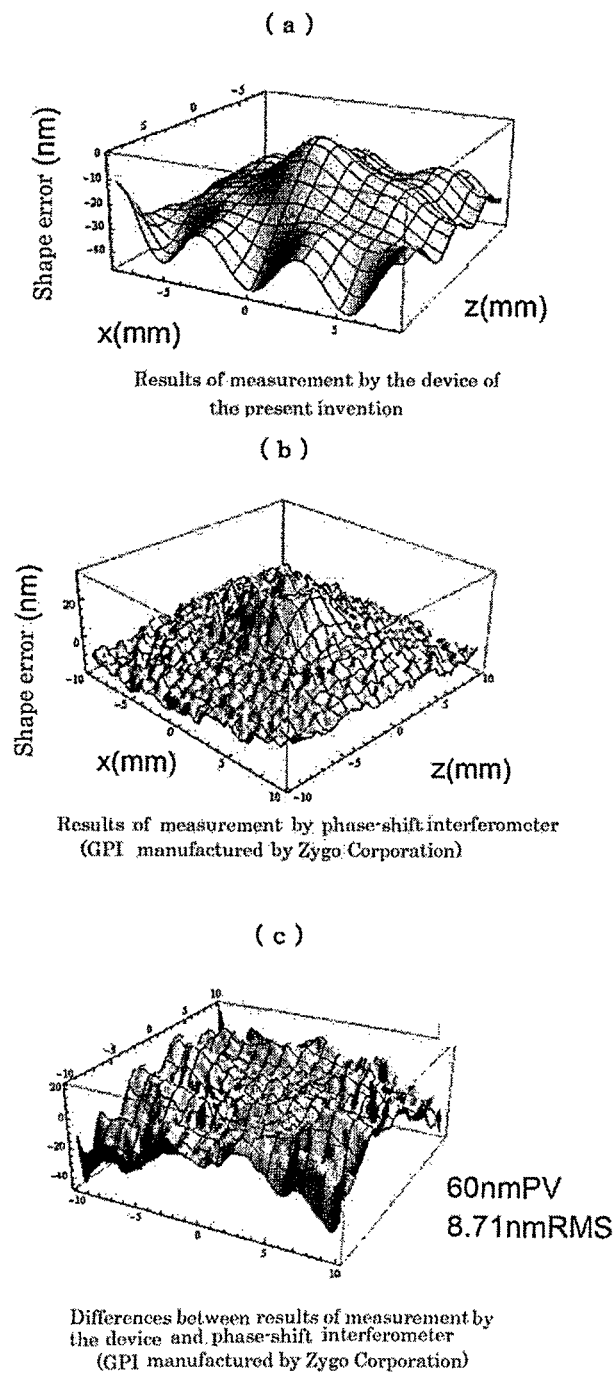
FIG. 12 also shows results of three-dimensional shape measurement of the spherical mirror with R=400 mm.

Next, the spherical mirror with R=400 mm was subjected to three-dimensional measurement using the normal vector tracing ultra-precision shape measurement method of the present invention. FIG. 11 shows results of the measurement. FIG. 11 (a) shows a measured shape of the spherical mirror within an area of ±10 mm square including the center of the spherical mirror. As in the case of the two-dimensional measurement, it is not possible to recognize any deviation from the ideal shape at this scale, FIG. 11 (b) shows shape error with respect to the ideal shape, with reference to the center of the spherical mirror. A peak value of the shape error is 40 nm PV at the central part of the spherical mirror. FIG. 11 (c) shows repeatability measurement error resulting from two three-dimensional measurements, and the repeatability measurement error is measured 40 nm PV, 5.90 nm RMS. The shape error includes regular waves at edges of a shape measurement area because Fourier series are used for shape derivation, and the waves can be eliminated by appropriate end processing. FIG. 12 (a) shows results of measurement by the measurement device (using the shape measurement method of the present invention), FIG. 12 (b) shows results of measurement by a phase-shift interferometer (GPI manufactured by Zygo Corporation), and FIG. 12 (c) shows differences between results of measurement by the measurement device and by the phase-shift interferometer (GPI manufactured by Zygo Corporation).

Figure 13:
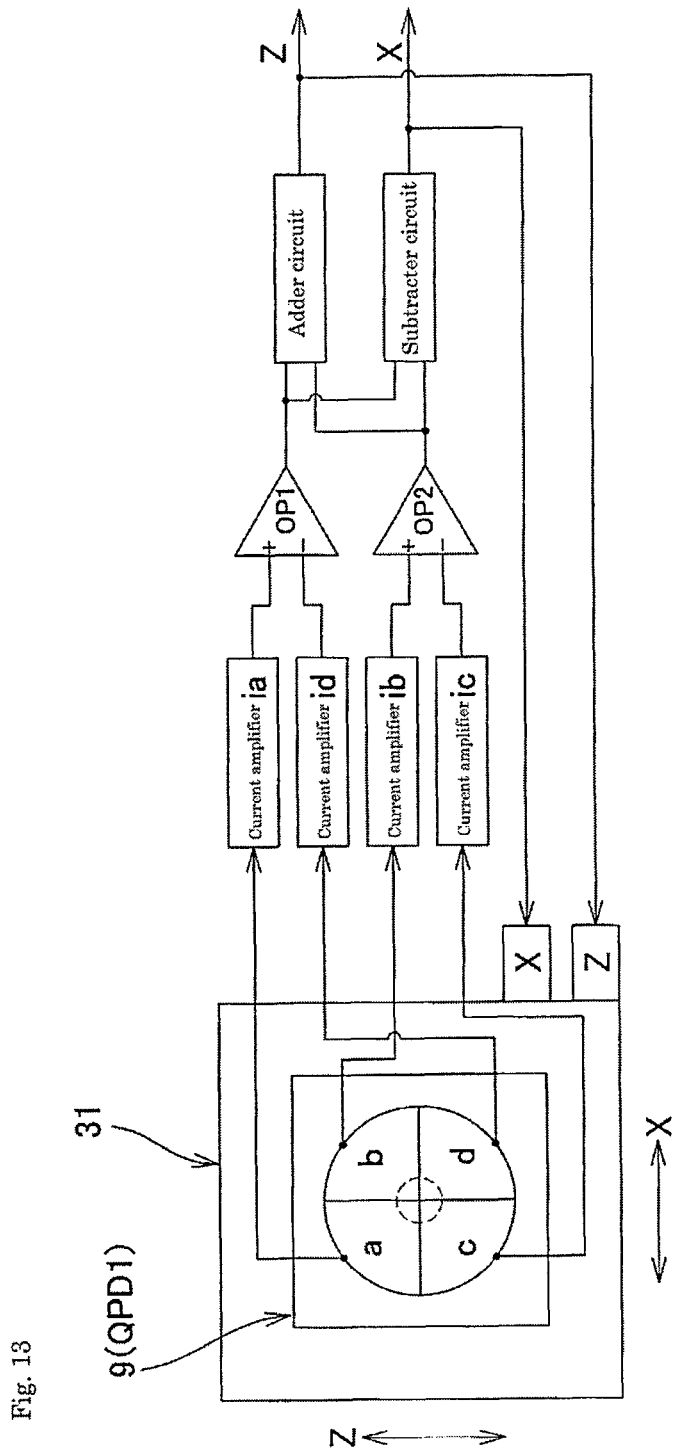
FIG. 13 is a simplified diagram describing an embodiment in which a QPD is displaced by a piezo-drive planar fine-motion stage to cancel out steady-state position deviation in a goniometer control system.

The foregoing embodiment is based on an imperfect null method. Accordingly, the occurrence of steady-stated position deviation cannot be avoided only by the control system with the biaxial goniometers. The steady-state position deviation varies within a range of several tens of Hz. If the QPD can trace fluctuations of the steady-state deviation to cancel out the steady-state deviation, shape measurement can be realized based on a perfect null method. Accordingly, as shown in FIG. 13, a piezo-driven two-dimensional planar fine-motion stage 31 is arranged at the movable part of the biaxial goniometers constituting the optical system 3, the QPD1 for position detection (detector 9) is mounted at a movable part of the planar fine-motion stage 31, encoder outputs on all the axes and a piezo-drive signal for the planar fine-motion stage 31 are obtained simultaneously when the output from the QPD1 becomes minimum, and measurement point coordinates and normal vectors derived from the encoder outputs are corrected with the piezo-drive signal for the planar fine-motion stage 31, thereby eliminating influence of the steady-state deviation in the goniometer control system. In this embodiment, the planar fine-motion stage 31 is approximately vertically arranged on the base stand 5 of the optical head 4. That is, the planar fine-motion stage 31 is an XZ piezo stage which is driven to cancel out the steady-state position deviations on X and Z axes. The piezo-driven two-dimensional planar fine-motion stage 31 has a responsiveness of 1 kHz or more, and displaces quickly the QPD1 in an XZ plane such that the foregoing steady-state position deviation becomes zero. At that time, if the output from the QPD1 is also read simultaneously and the read value is not zero, the measurement point coordinates and the normal vectors can be further corrected with the output from the QPD1 as in the foregoing embodiment.

This embodiment is based on the premise that the biaxial goniometers constituting the optical system 3 and the uniaxial straight-ahead stage are subjected to fully-closed feedback control under which output from the QPD1 is input directly into the axis drive motor, and the biaxial goniometers constituting the sample system 2 are subjected to semi-closed feedback control. As in the foregoing, when only the QPD 1 is mounted at the movable part of the planar fine-motion stage 31, the piezo-driven movable part of the stage 31 has a smaller inertial mass, thereby assuring responsiveness.

If the optical head 4 is sufficiently lightweight and can be piezo-driven to provide a responsiveness of several tens of Hz or more, the optical head 4 including the QPD1, the light source, and the like, may be mounted at the movable part of the planar fine-motion stage 31 and piezo-driven so as to cancel out the steady-state position deviation.

REFERENCE SIGNS LIST

1 Object to be measured
2 Sample system
3 Optical system
4 Optical head
5 Base stand
6 Optical fiber
7 Collimator lens
8 Point light source
9 Position detector (QPD1)
10 Beam splitter
11 ¼ wavelength plate
12 Collecting lens
13 Measured surface
14 Half mirror
15 Cylindrical lens
16 Distance detector (QPD2)
21 Fixed stand
22 C2-axis goniometer
23 A2-axis goniometer
24 Holder
25 Straight-ahead stage
26 C1-axis goniometer
27 A1-axis goniometer
31 Planar fine-motion stage
M Horizontal shape measurement device

The invention claimed is:

1. A normal vector tracing ultra-precision shape measurement method, comprising the steps of:
   preparing at least two pairs of biaxial goniometers and a uniaxial straight-ahead stage changing a distance between rotation centers of the goniometers, wherein one pair of goniometers constitutes a sample system and holds an object to be measured at a movable part thereof, and the other pair of goniometers constitutes an optical system and has at a movable part thereof a light source and a light detector using a quartered photodiode (QPD) based on a null method;
   controlling the two pairs of biaxial goniometers to overlap completely a measurement beam emitted from the light source and a reflection beam reflected on the surface of the object to be measured;
   controlling the uniaxial straight-ahead stage to keep constant a light path length L between the light detector and the surface of the object to be measured;
   measuring a normal vector at an arbitrary measurement point on the surface of the object to be measured to determine the shape of the object to be measured; and
   subjecting of the two pairs of biaxial goniometers and the uniaxial straight-ahead stage, one pair of biaxial goniometers and the uniaxial straight-ahead stage to fully-closed feedback control (follow-up control) inputting under which output from the QPD directly into an axis drive motor, subjecting the remaining pair of biaxial goniometers to semi-closed feedback control (constant value control), acquiring simultaneously encoder outputs on all the axes and QPD output, and correcting measurement point coordinates and normal vectors derived from the encoder outputs with the QPD output, thereby eliminating influence of steady-state deviation in the goniometer control system.

2. The normal vector tracing ultra-precision shape measurement method according to claim 1, wherein the biaxial goniometers constituting the optical system and the uniaxial straight-ahead stage are subjected to fully-closed feedback control under which output from the QPD is input directly into the axis drive motor, and the biaxial goniometers constituting the sample system are subjected to semi-closed feedback control.

3. A normal vector tracing ultra-precision shape measurement method, comprising the steps of:
   preparing at least two pairs of biaxial goniometers and a uniaxial straight-ahead stage changing a distance between rotation centers of the goniometers, wherein one pair of goniometers constitutes a sample system and holds an object to be measured at a movable part thereof, and the other pair of goniometers constitutes an optical system and has at a movable part thereof a light source and a light detector using a quartered photodiode (QPD) based on a null method;
   controlling the two pairs of biaxial goniometers to overlap completely a measurement beam emitted from the light source and a reflection beam reflected on the surface of the object to be measured;
   controlling the uniaxial straight-ahead stage to keep constant a light path length L between the light detector and the surface of the object to be measured;
   measuring a normal vector at an arbitrary measurement point on the surface of the object to be measured to determine the shape of the object to be measured; and
   subjecting the biaxial goniometers constituting the optical system and the uniaxial straight-ahead stage to fully-closed feedback control (follow-up control) inputting under which output from the QPD directly into an axis drive motor, subjecting the biaxial goniometers constituting the sample system to semi-closed feedback control (constant value control), and wherein arranging a piezo-driven two-dimensional planar fine-motion stage at the moveable part of the biaxial goniometers constituting the optical system, mounting the QPD at a movable part of the planar fine-motion stage, and when the QPD output becomes minimum, acquiring simultaneously encoder outputs on all the axes and a piezo-drive signal for the planar fine-motion stage, correcting measurement point coordinates and normal vectors derived from the encoder outputs with the piezo-drive signal for the planar fine-motion stage, thereby eliminating influence of stead-state deviation in the goniometer control system.

4. The normal vector tracing ultra-precision shape measurement method according to claim 3, wherein only the QPD is mounted at the movable part of the planar fine-motion stage.

* * * * *